Aug. 1, 1939.  D. H. SWEET  2,167,915

GAME

Original Filed Feb. 20, 1928

INVENTOR.
DONALD H. SWEET
BY
Freeman and Sweet
ATTORNEYS

Patented Aug. 1, 1939

2,167,915

UNITED STATES PATENT OFFICE 2,167,915

GAME

Donald H. Sweet, Evanston, Ill.

Substitute for abandoned application Serial No. 225,802, February 20, 1928. This application March 18, 1933, Serial No. 661,426

7 Claims. (Cl. 273—131)

This invention relates to improvements in competitive educational games, and includes among its objects and advantages the provision of an educational game combining vocabulary requirements analogous to those of anagrams, with geometrical maneuvering analogous to that of chess.

This application is a substitute for applicant's prior abandoned application, Serial No. 255,802, filed February 20, 1928.

The broad idea of providing a game embodying both these qualities is not new, but the problem appears to be seriously complicated by the increase in the number of pieces over the number employed in chess and the limitations of human intelligence as to intricacy in maneuvering. It is believed to be on this account that previous attempts along this line have, so far as I am aware, uniformly resulted in failure.

Figures 1, 2, 3:
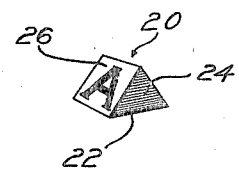
Figure 1 is a plan diagram of a playing board according to the invention, indicating one arrangement of the playing pieces.
Figure 2 is a diagram indicating an alternative arrangement.
Figure 3 is a perspective view of one of the playing pieces.

In the embodiment of the invention selected for illustration in Figure 1, the board 10 comprises sixty-three playing areas, each playing area being available for the resting of any piece; and two contrasting sets of playing pieces, each set including twenty-six pieces, one corresponding to each letter of the alphabet, each piece positioned at the beginning of the game in the precise position shown by the drawing, not necessary to be enumerated at length herein. It is noted, briefly, that except for the transposition of y and z the letters are in alphabetical order in rows from left to right extending the entire width of the board except for the fourth row which terminates short of the edge of the board at both ends by one playing area. This leaves seven open playing areas in a straight row across the middle of the board which, combined with the four additional open playing rows at the side edges of the board, constitute the initial area of combat for interengagement. However, as the pieces are moved and some of them are removed from the board, the moving and removal cause the combat area to spread over the entire board as the game progresses.

The game differs markedly from both checkers and chess in that every piece has the move of a queen at chess, but at the same time the relatively limited open area available for combat limits the activity of the pieces and the intricacy of the combat at the start, whereas no material limitation of this sort obtains in chess or checkers. It also differs markedly from chess or checkers in that capture is effected, not by jumping over an opposing piece, nor by moving the attacking piece onto the square previously occupied by the piece to be captured, but by mere juxtaposition of one or more attacking pieces to one or more attacked pieces in such a way that three or more pieces, including at least one attacked piece lie juxtaposed in a straight line in any direction—transverse, longitudinal, or diagonal in the correct order to spell the word in question.

The objective of the game also differs from the removal or entrapment of all opposing pieces as in checkers and from the capture of a single piece of relatively low power as in chess. The objective is the removal of all the more powerful pieces of the opponent comprising the five vowels, a, e, i, o, and u, and the semi-vowel y.

The game also differs from previous attempts to develop a word forming and geometrical game in that it possesses fully the two essential attributes of a competitive two-sided game, which are:

First, that no vital advantage attends the first move;

Second, that the game does not become so intricate that it is practically impossible to play it.

The game also possesses to a very outstanding degree the following material advantages:

First, that it begins with a reasonably simple series of opening moves in which the players jockey for position;

Second, that the opening moves are followed by a more intricate melee in which heavy casualties occur;

Third, that between players of approximately comparable ability it terminates in an open end game; and, Fourth, that draw games are substantially as rare as in chess.

It possesses another outstanding advantage in that the principles of the game can be mastered with a minor fraction of the mental effort necessary in chess, so that a beginner can enjoy it after a few minutes study; but, because it depends on vocabulary also, the limit of playing ability can only be reached by those possessing a wide and varied vocabulary and an accurate knowledge of what is or is not a proper English word.

In Figure 2 I have shown an alternative arrangement of letters for a formal game. Both the arrangement of Figure 1 and the arrangement of Figure 2 are such that no material advantage attends the first move. I have found it difficult, if not impossible, to develop any arrangement of letters on a board eight or more squares wide, where material advantage does not attend the first move.

The game may also be played by placing the twenty-six playing pieces of each player entirely at random on the same twenty-six squares occupied by the same pieces in Figure 1 and in Figure 2. Then before moving begins each player is allowed a specified number of transpositions to rearrange the letters and protect himself from the first move of the opponent. I have found that two such transpositions for the player who moves first and three such transpositions for the other player, if skillfully made, afford adequate opportunity for each player to eliminate any material disadvantage in any accidental arrangement of his letters that might afford an advantageous point of attack for the opponent.

The rules I prefer to use in playing the game are as follows:

The formal game

The players match or draw for colors and red plays first. Each player sets up his pieces as illustrated in Figure 1 of the drawing.

A move consists of moving any one man any number of squares in any straight line, forward or back, sidewise, or diagonal. The square to be occupied (and the intervening square, if any) must be vacant. Thus, on the first move Y can be moved to any one of four adjacent squares, but cannot be moved two spaces at all because there is no room. U may be moved one, two, or three spaces forward, but it cannot be placed in front of Z because Y blocks its path. This is the queen's move in chess.

A word is formed whenever the letters spelling it are brought next each other in any straight line with no vacant spaces intervening. The presence of other letters beyond one or both ends is immaterial. Words must consist of not less than three letters and must be those listed in a standard English dictionary. Foreign words, slang, proper and geographical names, prefixes, suffixes, colloquialisms, abbreviations, etc., do not count.

A player forming a word containing one or more of his opponent's letters, is entitled to have such letters removed from the board and move again. The player forming a word should announce the fact, spell the word, and the opponent should then either challenge the propriety of the word or remove such of his pieces as form part of it.

A player forming more than one word by a single move may announce only one word at a time, and the opposing pieces in it must be removed before another word is announced. If he moves again before announcing a word formed by his play and still remaining on the board, the move must be retracted, and his opponent may claim the word he failed to announce, and continue to play. A word formed and not noticed at the time by either player belongs to the player who is playing when it is called to attention. It is proper for a player noticing such a word during his opponent's play, to remain silent until the opponent has finished and then claim any such word remaining, or any word formed by the last move of his opponent's play.

The players play alternately until one player has removed A, E, I, O, U, and Y of his opponent's pieces and is thereupon declared the winner.

The free style game

This interesting variation of the formal game is a little slower at the start, but of much greater variety in play.

The letters of each player are placed entirely at random, but all within the squares occupied by the same set of letters in the formal game. Transposing is a play in which the player interchanges the positions of any two of his own letters. Thus white may remove his A from an exposed position at square 64 and his Q at square 96, and put the A at 96 and the Q at 64, to transfer his vowels to protected positions before moving begins. White transposes first, then red, and so on for five plays, three by white and two by red. Any one of these plays may be waived by the player in case he prefers to let his letters remain as they are. The sixth, or any subsequent play may be by moving instead of transposing, at the option of the player whose turn it is. After a move is made no more transposing may be done by either player.

I am aware of such alleged proposed competitive games as are disclosed in United States Patent 810,631 of January 23, 1906, United States Patent 1,591,369 of July 6, 1926, and British Patent 1,239 of January 23, 1889. Practical tests have shown that the game of Patent 810,631 always results in victory by the player who has the first move, and that the other two disclosures involve such a vast intricacy that the play becomes practically hopeless.

The playing piece I prefer to use is indicated in Figure 3 and comprises a body 20 having a flat base at 22 and vertical end faces 24. The faces carrying indicia, of which only one—26—can be seen in Figure 3, face outwardly in opposite directions and upwardly, making an angle of between 30° and 75° with the base 22. About 50° gives excellent results in presenting the face 26 squarely to the view of the player looking down on the board from one side, and substantially concealing that face from the view of the player on the other side who has the identical indicia to look at on the opposite face. Of course, a player craning his head forward to a position approaching a point over the board would be able to see over the edge of the body, but even then the face 26 is so nearly edgewise to his eye that it attracts very little attention. Thus each player is confronted with letters of all the pieces, his own as well as opponents, that read from top to bottom and from left to right and are right side up and properly oriented, and his eye is not confused by having the field of view also contain the same fifty two letters upside down. At the same time the same fifty two letters upside down are there for the convenience and use of his opponent but substantially concealed from his own point of view.

Each of the playing areas is numbered, and the numbers are arranged in a simple series. By having the numbers carried by the board itself, a player remote from the board can call moves orally in simple terms, and a simple record of each move may be written down as the game progresses.

Having thus described and fully ascertained the nature of my invention, and the best mode at present known to me in which the same may be practiced, I declare that what I claim is new is as follows:

1. A competitive game adapted to be played by two players only, comprising a board marked with playing areas arranged in transversely and longitudinally extending rows, all of said playing areas being available for the resting of any piece, said board being rectangular and nine areas long and seven areas wide; in combination with two contrasting sets of playing pieces, each said set being composed of twenty six pieces of identical power, but corresponding to the letters of the English alphabet, whereby the word-forming power of each piece differs from that of every other piece both in nature and amount, said pieces being originally positioned approximately in alphabetical order in solid massed formation at opposite ends of the board, and together occupying all but eleven of the available playing areas.

2. A playing piece for a competitive educational game comprising a body having a supporting base and two inclined faces each facing upwardly, said faces also facing outwardly in opposite directions, whereby each face directly confronts a player looking downwardly and inwardly from one side of the board, and is substantially hidden from the view of a player looking downwardly and inwardly from the opposite side of the board, said faces carrying identical identifying indicia, the indicia on each face arranged from top to bottom and from left to right from the point of view of the player confronted thereby, said body being sufficiently opaque so that neither set of indicia is noticeable through the body.

3. A competitive game adapted to be played by two players only, comprising a board marked with playing areas arranged in transversely and longitudinally extending rows, all of said playing areas being available for the resting of any piece, said board being rectangular and nine areas long and seven areas wide; in combination with two contrasting sets of playing pieces, each said set being composed of twenty six pieces of identical moving power, but corresponding to the letters of the English alphabet, whereby the word-forming power of each piece differs from that of every other piece both in nature and amount, said pieces being originally positioned approximately in alphabetical order in solid massed formation at opposite ends of the board, and together occupying all but eleven of the available playing areas, each individual playing area carrying identifying indicia differing from the indicia for every other area, whereby moves may be announced orally in a simple code, and a simple code record of a game may be kept.

4. A competitive game adapted to be played by two players only, comprising a board longer than it is wide; the length and width having the ratio of nine squares to seven squares, in combination with two contrasting sets of playing pieces, each set of playing pieces being composed of twenty-six individual pieces each corresponding to one of the letters of the English alphabet, each piece occupying a full square, whereby the fifty two pieces occupy all but eleven squares of the board.

5. Apparatus for playing a game of the general type of checkers or chess according to which game each playing piece may be moved backward or forward, sideways, or diagonally through any number of unoccupied spaces to form certain combinations with other pieces upon the formation of which certain pieces entering the combination are removed from the board, said apparatus comprising two sets of playing pieces, each set consisting of a plurality of pieces bearing various letters of the alphabet and a playing board divided into seven rows of playing areas, said playing areas being greater in number than the playing pieces but few enough in number to substantially restrict the possible movements of the playing pieces to a relatively few when all of the playing pieces are on the board at the start of the game.

6. Apparatus for playing a game of the general type of checkers or chess according to which game each playing piece may be moved backward or forward, sideways, or diagonally through any number of unoccupied spaces, said apparatus comprising a rectangular game board divided into seven rows of playing areas each row containing nine areas, and two sets of playing pieces each containing twenty-six pieces, one marked with each letter of the alphabet, whereby the playing pieces when all on the board will so nearly fill the board as to properly restrict the play at the beginning of a game.

7. Apparatus for playing a game of the general type of checkers or chess according to which game each playing piece may be moved backward or forward, sideways, or diagonally through any number of unoccupied spaces to form certain combinations with other pieces upon the formation of which certain pieces entering the combination are removed from the board, said apparatus comprising: two contrasting sets of playing pieces, each set composed of twenty-six individual pieces, each piece of each set corresponding to a different letter of the English alphabet; and a board longer than it is wide and subdivided into square playing areas, any one of which may receive one piece but only one; said board being wide enough to accommodate only seven pieces in a single transverse row, whereby the number of possible arrangements of pieces are correspondingly limited.

DONALD H. SWEET.